United States Patent [19]
Yanagi

[11] Patent Number: 6,041,213
[45] Date of Patent: Mar. 21, 2000

[54] COMPACT IMAGE FORMING APPARATUS CAPABLE OF SMOOTH DOUBLE SIDE PRINTING IN A SHORT TIME

[75] Inventor: Kenzo Yanagi, Niigata, Japan

[73] Assignee: NEC Corporation, Japan

[21] Appl. No.: 09/203,197

[22] Filed: Nov. 30, 1998

[30] Foreign Application Priority Data

Nov. 28, 1997 [JP] Japan ................................ 9-328538

[51] Int. Cl.⁷ ................................................. G03G 15/00
[52] U.S. Cl. ........................... 399/401; 271/301; 358/296
[58] Field of Search ................................. 397/364, 401, 397/402; 355/24, 26; 271/301; 358/296, 1.12, 1.16, 1.17; 395/111, 115, 116

[56] References Cited

U.S. PATENT DOCUMENTS

| | | | |
|---|---|---|---|
| 4,918,490 | 4/1990 | Stemmle | 399/401 |
| 5,583,607 | 12/1996 | Fujioka et al. | 355/25 |
| 5,872,900 | 2/1999 | Tsuchitoi | 395/111 |

FOREIGN PATENT DOCUMENTS 4-279373  10/1992  Japan .

*Primary Examiner*—Joan Pendegrass
*Attorney, Agent, or Firm*—Ostrolenk, Faber, Gerb & Soffen, LLP

[57] ABSTRACT

An image forming apparatus includes a print data memory 34 for storing print data inputted, a printing unit for printing (13, 24) on a sheet of recording paper 23 based on the printing data stored in a print data memory 34, a first waiting unit (12) for making a sheet of recording paper 23 already printed on one side by the printing means wait, a controller 18 which reads printing data for two pages succeeding the page printed on the preceding recording paper 23 into the print data memory 34 and expands the data into a printable state after the recording paper 23 has left for the first waiting unit (12), and then, feeds the succeeding recording paper 23 to the printing unit (13, 24) to print on one side thereof by the printing unit.

4 Claims, 2 Drawing Sheets

COMPACT IMAGE FORMING APPARATUS CAPABLE OF SMOOTH DOUBLE SIDE PRINTING IN A SHORT TIME

BACKGROUND OF THE INVENTION

The present invention relates to an image forming apparatus and an image forming method using an electrophotographic process, such as a printer, a facsimile, or the like, and more particularly to an image forming apparatus and an image forming method having a double-side printing function for printing on both sides of a recording paper.

In a conventional image forming apparatus having such a double-side printing function, the processing described hereinunder are repeated. Namely, after finishing a printing on one side of a preceding recording paper, printing data on a next page are read from a higher rank apparatus to be printed on one side of a succeeding recording paper. Thereafter, printing data for the following page are read therefrom to be printed on the other side of the preceding recording paper. Thus, while printing is performed on one side of the succeeding recording paper, the preceding recording paper has to wait for a relatively long time in a state partly projected from a discharging port. Therefore, a problem is sometimes caused to occur inevitably in the conventional image forming apparatus having the double-side printing function. Namely, a user and so on sometimes pull out the paper in the above mentioned waiting state by mistake from the discharging port.

In order to avoid the problem, some methods have been employed in conventional image forming apparatus. Namely, in a first conventional image forming apparatus, a discharged paper receiving unit or a transfer path on which a recording paper is kept waiting after being printed on one side thereof is enlarged in size. Further, in a second conventional image forming apparatus, both side printing is never started on a succeeding recording paper until printing is completed on both sides of a preceding recording paper. Moreover, a third conventional image forming apparatus is disclosed in unexamined Japanese Patent Publication Hei1-279373, namely 279373/1992. In the third conventional image forming apparatus disclosed therein, a buffer memory for storing printing data from a higher rank apparatus is enlarged in capacity to increase the number of printable pages at a single time storage. Thereby, a printing time for each recording paper is shortened to reduce a waiting time for a recording paper mentioned above.

However, in the first conventional image forming apparatus, the enlargement of a size of the discharged paper receiving unit or the transfer path results in upsizing of the image forming apparatus itself. Further, the second conventional image forming apparatus in which both side printing is never stated on a succeeding recording paper until printing is completed on both sides of a preceding recording paper inevitably becomes slow in printing speed. Moreover, in the third conventional image forming apparatus disclosed in the above-mentioned publication, an increase of capacity of the buffer memory causes an increase of cost.

SUMMARY OF THE INVENTION

It is therefore an object of the present invention to provide a compact image forming apparatus which is manufactured at a low cost and which is capable of smoothly operating a double side printing although reducing a waiting time as much as possible with a recording paper projected outward from the apparatus.

Other objects of the present invention will become clear as the description proceeds.

According to an aspect of the present invention, there is provided an image forming apparatus comprising: means for once storing inputted printing data, means for printing a recording paper based on the printing data stored in said storing means, first waiting means which make a recording paper already printed one side thereof by said printing means wait, and control means which read and expand printing data for two pages succeeding the page printed on said preceding recording paper at a printable state, after said recording paper has left for said first waiting means, and which then feed the succeeding recording paper to said printing means to print the succeeding recording paper on one side thereof by said printing means.

The image forming apparatus according to the present invention can reduce a waiting time with a recording paper projected outward therefrom by storing printing data for two pages at a time, compared with a conventional one by which printing data only for one page is stored each time. Therefore, it is possible to avoid an erroneous operation like pulling out the recording paper during printing. Further, since the storage means has only to have a storage capacity capable of storing printing data once for two pages at a time of double side printing, it can be configured from a small type of memory. Moreover, since double side printing can smoothly be performed while storing printing data for two pages at a predetermined timing, it is not necessary to make the paper receiving unit or the transfer path large in size. Accordingly, it is possible to avoid the above-mentioned upsizing of the image forming apparatus.

Here, it is desirable to provide in the image forming apparatus paper reversing means for reversing a recording paper waiting at the first waiting means and second waiting means which make the recording paper forwarded from the paper reversing means wait and which also send the recording paper to said printing means at a predetermined timing. In this case, it is possible to make a printed recording paper wait both at the first and the second waiting means at an appropriate timing, and both sides printing processing can be achieved smoothly.

More preferably, the control means complete printing on one side of the succeeding recording paper before printing on the other side of the preceding recording paper waiting at the second waiting means, and then reverses the succeeding recording paper waiting at the first waiting means by the paper reversing means and forward the reversed succeeding recording paper to the second waiting means and also performs printing on the other side thereof at a predetermined timing.

In this case, both sides printing processing can be performed very smoothly.

Moreover, it is desirable for the first waiting means to be provided with a function to eject a recording paper having been completed in printing on one and the other sides thereof from the image forming apparatus. In this case, since the first waiting means can also serve as paper discharging means, a configuration of the apparatus can be simplified.

According to another aspect of the present invention, there is also provided an image forming method for sequentially printing on one and the other sides of a recording paper based on printing data inputted. The image forming method comprising the steps of: printing data for a first page on one side of the preceding recording paper to forward the preceding recording paper to the waiting position, reading data for second and third pages succeeding the first page to expand the data into a printable state, printing the data for said third page on one side of the succeeding recording paper, and printing the data for the second page on the other side of the preceding recording paper at said waiting position, in the above position.

Since it is possible to reduce the waiting time in the state of recording paper projected outward from the apparatus also by the above-mentioned image forming method, an erroneous operation as pulling out a recording paper during printing is avoidable. Further, both side printing can be executed smoothly while storing printing data for two pages at a predetermined timing.

DETAILED DESCRIPTION OF THE PREFERRED EMBODIMENT

Figure 1:
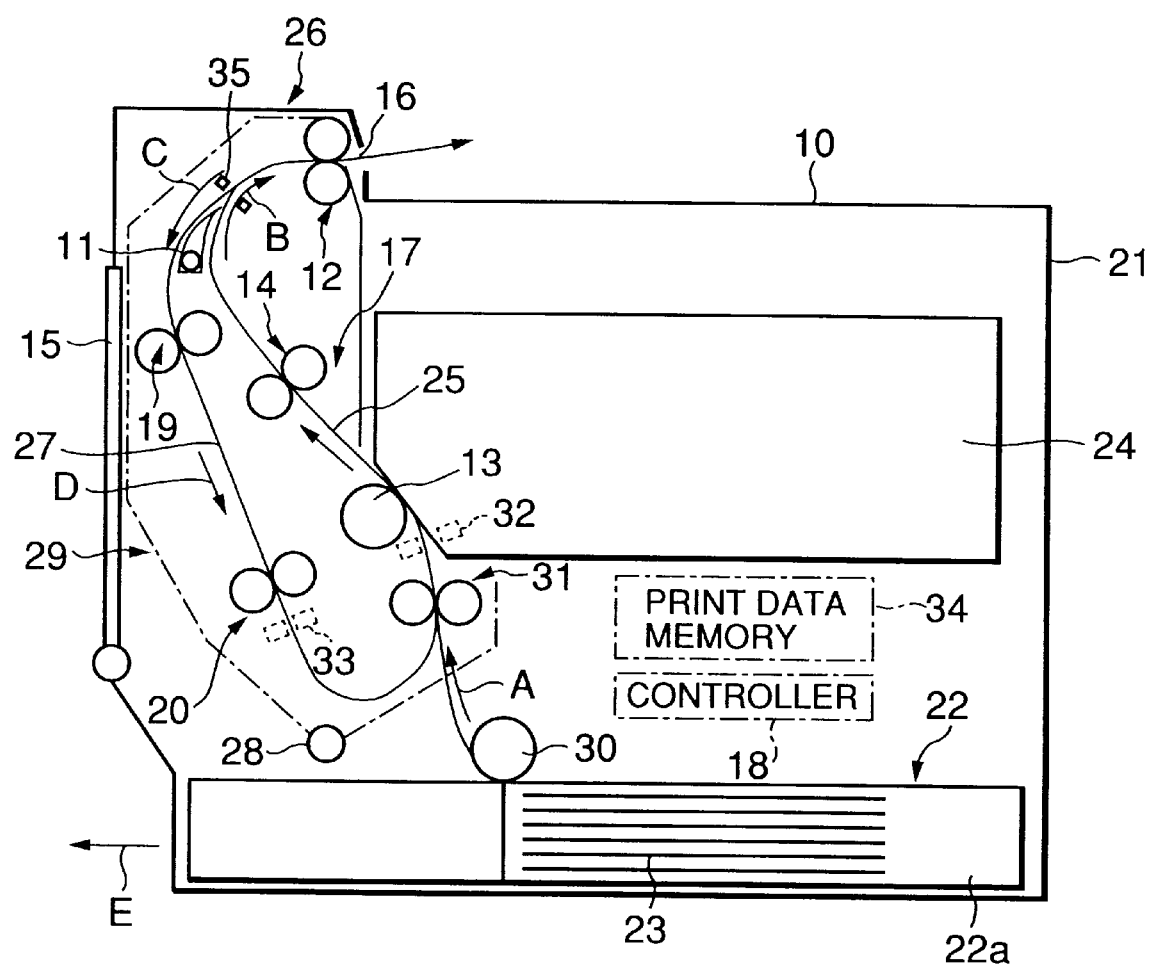
FIG. 1 is a schematic cross sectional view of the image forming apparatus according to a preferred embodiment of the present invention.

Referring now to FIG. 1, description will proceed to an image forming apparatus according to a preferred embodiment of the present invention. FIG. 1 shows a schematic cross sectional view of the image forming apparatus according to the preferred embodiment of the present invention.

As illustrated in FIG. 1, the image forming apparatus comprises an apparatus main body 21, and has a one-side printing mode and a both-side printing mode which can be changed over to each other by means of a predetermined operation. The apparatus main body 21 is provided with a process unit 24 located approximately in the central part, a paper receiving part 10 in the upper part; a paper feeding part 22 in the lower part; and a conveying mechanism 17 in front of the process unit. The apparatus main body 21 is further provided with a controller 18 comprising a microcomputer, or the like and a print data memory 34 for storing printing data inputted from a higher rank apparatus such as a personal computer, etc. and a jam releasing cover 15 is arranged to be freely rotatable.

The process unit 24 has a function for sequentially printing on carried recording paper 23 based on the data stored in a print data memory 34, and is provided with an unshown photoreceptor drum, a toner tank, and an optical system unit, or the like. At a counter position of the photoreceptor drum, a transfer roller 13 is arranged for transferring a toner image generated on the photoreceptor drum onto a sheet of recording paper 23.

In a case of both-side printing, a paper receiving part 10 forms a first waiting position for mounting an edge part of the recording paper 23 waiting partly projecting from a paper discharging port 16 after a completion of one-side printing and also forms a stacker for stacking recording paper 23 discharged from the paper discharging port 16 after a completion of both-side printed. The paper feeding part 22 is loaded with a paper feeding cassette 22a for reserving recording paper 23, and on the upper part of the paper feeding cassette 22a, a pickup roller 30 is arranged for supplying recording paper 23 from the paper feeding cassette 22a.

The conveying mechanism 17 is provided with a resist-roller pair 31, a transfer roller 13, a first conveying path 26, and a fixing roller pair 14 for thermally fixing unfixed toner image by applying hat and pressure to the recording paper passing through there. The conveying mechanism 17 is further provided with a paper reversing roller pair 12, a conveying direction change-over plate 11 for changing over a conveying direction of the recording paper 23 by a turning action, a conveying roller pair 19, a second conveying path 27, a paper stop roller pair 20, and paper detecting sensors 32, 33, 35 composed of photo sensors, etc.

The resist-roller 31 conveys the recording paper 23 conveyed in the direction of an arrow A at exact timing with the rotation of the photoreceptor drum. The paper reversing roller pair 12 makes the recording paper 23 advance to the paper receiving part 10 or wait at the position by rotating forward or stopping, and when it is rotated backward, it conveys the printing paper 23 waiting at the first waiting position on the paper receiving part 10 to the second conveying path 27. The paper stop roller pair 20 rotates forward or stops, and it rotates forward when it conveys the recording paper 23 to the following processing, and to halt the recording paper 23, the pair halts at a given timing when it holds the passing recording paper 23 in the neighborhood of its top edge. When the pair halts the recording paper 23 by holding its top edge, the conveying path in the neighborhood of the paper halting roller 20 becomes the second waiting position.

The paper detecting sensor 32 detects a back end part of the recording paper 23 passing through a printing part between the transfer roller 13 and the photoreceptor drum, and transmits its detected signal to a controller 18. The controller 18, based on this detected signal, detects that printing has been completed by the printing part. The paper detecting sensor 33 detects the top edge of the recording paper 23 projected from a contact part of both rollers of the paper halting roller pair 20, and transmits its detected signal to the controller 18. The controller 18, based on this detected signal, halts the forward-rotating paper halting roller pair 20 at the given timing, and halts the passing recording paper 23 by holding the neighborhood of the top edge.

The paper detecting sensor 35 detects the back end part of the recording paper 23 which is conveyed by backward rotation of the paper reversing roller pair 12 and is passing by a conveying direction changeover plate 11, and transmits the detected signal to the controller 18. The controller 18, based on this detected signal, detects that the recording paper 23 has been reversed. Further, the paper detecting sensor 35 detects the back end part of the recording paper 23 conveyed from the first conveying path 25, and transmits the detected signal to the controller 18. The controller 18, based on this detected signal, detects that the recording paper 23 has entered the contact part of the paper reversing roller pair 12.

A paper reversing part 26 is composed of the paper reversing roller pair 12 and the conveying direction change-over plate 11, and a paper conveying part 29 is composed of other rollers, or the like. A mark 28 in the Figure is a bearing shaft for turning the whole conveying mechanism 17 in the back and forth directions of the apparatus.

The controller 18 controls processing by each part of the apparatus, having each function to execute one-side ordinary printing of the recording paper 23 and a both-side printing respectively, expanding a printing image based on the printing data stored once in a print data memory 34, and executing printing on the recording paper 23 by a processing unit 24.

For example, when both-side printing is performed with printing data for four pages on two successive sheets of the recording paper 23, the controller 18 performs printing on one side of the first sheet of the recording paper 23 according to the printing data for the first side (the second page of four successive pages) of the first page data. Then, the controller reads printing data such as the second page data for the second side (the first page of the same) and the third page data for the third side (the fourth page of the same) from a higher rank apparatus into the print data memory 34 and expands them. The controller 18 further performs printing on one side of the second recording paper 23 according to the printing data for the third side, and sends this recording paper 23 to the paper receiving part 10. Next, printing of the second side is performed on the other side of the preceding recording paper 23 waiting at the second waiting position before sending the following recording paper 23 waiting a the first position to the second waiting position while the following recording paper is being reversed by a paper reversing part 26, and printing of the fourth data for the fourth side (the third page of the same) is performed on the other side of the following recording paper 23.

Next, printing operation of the image forming apparatus of the above configuration will be described. Firstly, description will now be made on printing operation of printing data for two pages on a single sheet of the recording paper 23.

Before printing, the paper feed cassette 22a is drawn out in the direction of an arrow E, and the paper feed cassette 22a is replenished with the recording paper 23. Starting printing operation, the controller 18 rotates the pickup roller 30 and feeds the recording paper 23 from the paper feeding cassette 22a in the direction of the arrow A, and also supplies it to the printing part at a given timing by the resist roller pair 31, and then transfers a toner image for the first side (the second page) generated by the printing processing unit 24 onto one side of the recording paper 23 by means of the transfer roller 13.

Next, the transferred recording paper 23 is supplied to the fixing roller pair 14 via the first conveying path 25, and the unfixed toner image on the surface is thermally fixed by being press-contacted by the roller pair 14. Prior to this, the controller 18 turns the conveying direction change-over plate 11 counterclockwise in FIG. 1, and supplies the thermally fixed recording paper 23 to be conveyed in the direction of the arrow B to the paper reversing roller pair 12. Based on the detected signal from the paper detecting sensor 35, the controller 18 further detects whether or not the recording paper 23 has entered the paper reversing roller pair 12, and halts the paper reversing roller pair 12 rotating forward at the given timing. Thus, the recording paper 23 is held at the back end by the paper reversing roller pair 12 and is temporarily halted with the top end part projected on the paper receiving part 10.

The controller 18 turns the conveying direction change-over plate 11 in FIG. 1 clockwise at the given timing, and also rotates backward the paper reversing roller pair 12 to convey the recording paper 23 in waiting state in the direction of the arrow C, and then, reversed the front and back by the conveying direction change-over plate 11 to convey the paper in the direction of the arrow D and sends it to the resist roller pair 31 via the forward-rotating conveying roller pair 19 and the paper halting roller 20. Further, the resist roller pair 31 supplies the recording paper 23 to the printing part at the given timing, and the second side (the first page) toner image generated by the printing processing unit 24 is transferred onto the other side of the recording paper 23. Next, the transferred recording paper 23 is supplied to the fixing roller pair 14 to thermally fix the unfixed toner image on the other side before being sent to the paper receiving part 10. Prior to this, the controller 18 turns the conveying direction change-over plate 11 counterclockwise, and the recording paper 23 is discharged onto the paper receiving part 10 by the paper reversing roller pair 12 rotating forward.

Figure 2:
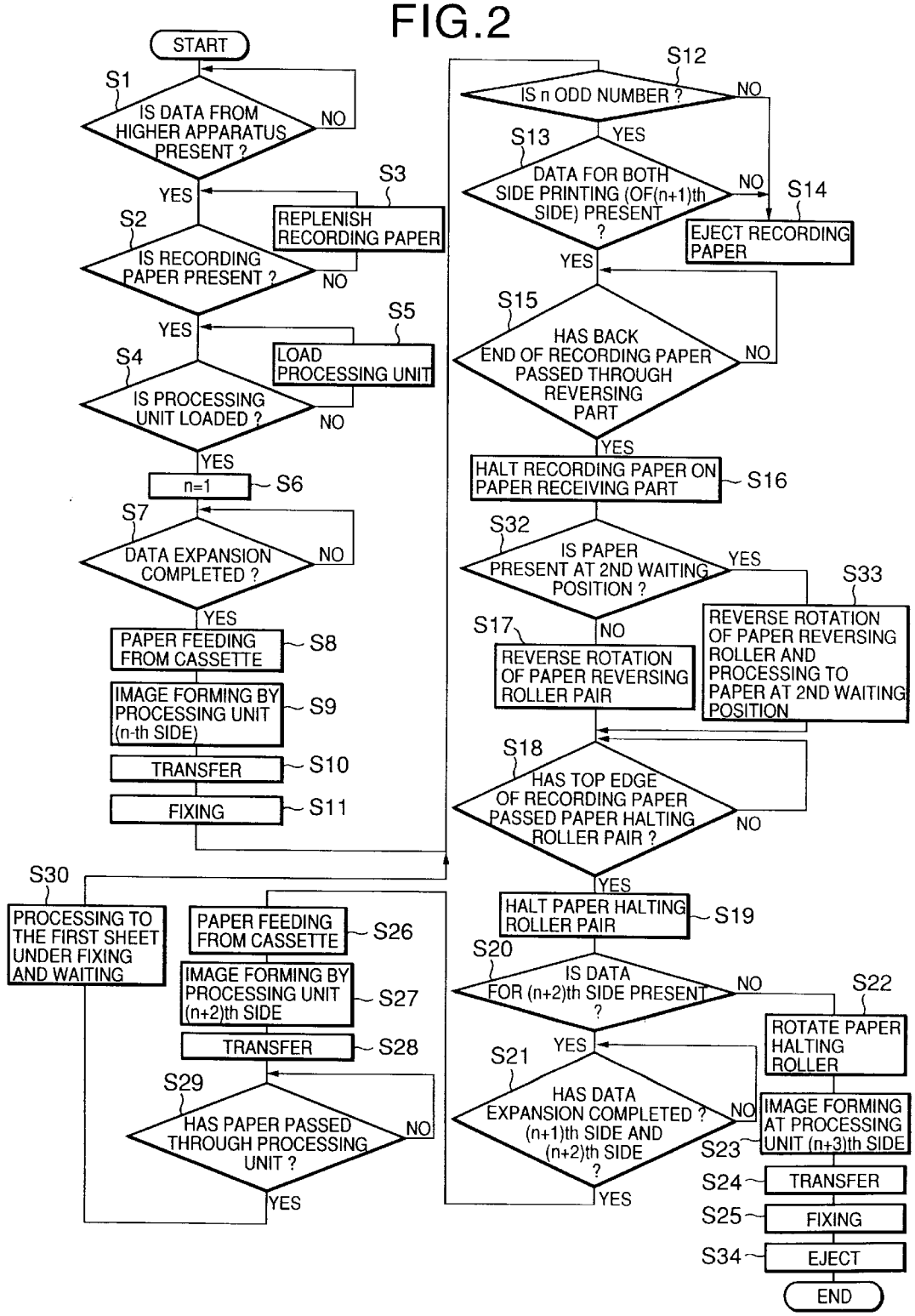
FIG. 2 is a flow chart for showing operations at the time of printing in the image forming apparatus illustrated in FIG. 1.

Referring to FIG. 2, description will proceed to an operation in the case of printing four pages of printing data onto two sheets of the recording paper 23 respectively. FIG. 2 is a flow chart for showing the operation.

First of all, the controller 18 judges the presence or absence of printing data transmitted from the higher rank apparatus at step S1, and when the printing data are present, it judges at step S2 whether or not the recording paper 23 is held in the paper feeding cassette 22a, and when the recording paper 23 is absent, it displays a warning on an unshown display part that paper replenishment is required (step S3). In this case, an operator draws out the paper feeding cassette 22a in the direction of the arrow E, and replenishes the paper feeding cassette 22a with the recording paper 23. On the other hand, when the recording paper is present, the controller 18 judges whether or not the processing unit 24 is loaded (step S4). If the processing unit is not loaded, it displays a warning (step S5) that the processing unit 24 should be loaded. In this case, the operator sets the processing unit 24 to the normal state. On the other hand, if the processing unit 24 is loaded, the side of n=1, the first side (the second page of four pages) is read from the higher rank apparatus at step S6 and stored in the print data memory 34.

At step S7, the controller 18 judges whether or not an expansion of printing data necessary for the first side at this time has been completed and has become printable. As a result, when the expansion of the printing data is completed, the pickup roller 30 is rotated at step S8 to feed a sheet of paper 23 in the direction of the arrow A and also supply it to the printing part at the given timing by the resist roller 31. Thus, the toner image for the first side generated by the printing processing unit 24 is transferred onto one side of the preceding first sheet of the recording paper 23 by the transfer roller 13 (step S9, S10).

When transfer on the first side is completed, the controller 18 reads the printing data for the second side and the third side from the higher rank apparatus in the print data memory 34, and expands the printing image into a printable state. Next, the unfixed toner image on one side is thermally fixed (step S11) by supplying the first sheet of the transferred recording paper 23 to the fixing roller pair 14 via the first conveying path 25, heating and press-contacting it. Prior to this, the controller 18 turns the conveying direction change-over plate 11 counterclockwise and supplies the thermally fixed recording paper 23 to be conveyed in the direction of the arrow B to the paper reversing roller 12.

At this time, the controller 18 judges whether or not (n) is an odd number, namely, the preceding printing has been related to an odd numbered side, and if it is related to an odd numbered side, the process goes to step S13, and if not, the printed recording paper 23 is discharged onto the paper receiving part 10 at step S14. At step S13, the controller judges the (n+1)th side to be printed on both sides, namely, the presence or absence of the printing data for the second side, and if this printing data is present, the process goes to step S15, and if it is absent, the recording paper is discharged onto the paper receiving part 10 at step S14.

At step S15, it is judged whether or not the first sheet of the recording paper 23 has passed through the paper reversing part 26 and entered the paper reversing roller pair 12. If the back end of this recording paper 23 is detected, the controller 18 halts the forward-rotating paper reversing roller pair 12 at the given timing, and holds the back end side of the recording paper 23 by this roller pair 12 and halts the paper with its top edge part projected part over the paper receiving part 10 for keeping the paper standing by at the first waiting position. (Step S16).

Next, at step S32, it is judged whether or not the recording paper 23 to be halted by the paper halting roller pair 20 is present at the second waiting position, and if the paper is absent, the process goes to step S17, and if present, the process goes to step S17 by way of step S33 that will be described later. Here, the recording paper 23 is not present at the second waiting position yet, the controller 18 turns the conveying direction change-over plate 11 clockwise at the given timing, reversing the rotation of the paper reversing roller 12, conveying the first sheet of the recording paper at the first waiting position in the direction of the arrow C, and conveying it further in the direction of the arrow D by way of the conveying roller pair 19 while reversing the front and back by the conveying direction change-over plate 11.

At step 18, the controller 18 further judges whether or not the first sheet of the recording paper 23 has been detected by the paper detecting sensor 33, and if it is detected, the controller recognizes as the top edge of the recording paper 23 has passed through the contact part of the paper halting roller 20 by a specific length, halting the forward-rotating paper halting roller pair 20, and making the first sheet of the recording paper 23 wait at the second waiting position (step S19).

Here, the controller 18 judges the presence or absence of the printing data for the (n+2)th side to be printed on both sides, namely, the third side, and if the printing data is stored in the print data memory 34, the controller judges whether or not the printing image related to the printing data for the (n+1)th side and the (n+2)th side has been expanded at step S21 (step S20, S21). Having checked that an expansion of the printing image has been completed, the controller 18 rotates the pickup roller 30 to feed the second sheet of recording paper 23 from the paper feeding cassette 22a (step S26).

The controller 18 conveys the second sheet of the recording paper 23 to the printing part by means of the resist roller 31 at the given timing, and the processing unit 24 and the transfer roller 13 transfer the toner image related to the printing data for the third side onto one side of this recording paper 23 (step S27, S28).

Next, when the back end of the second sheet of the recording paper 23 is detected, this recording paper 23 is conveyed to the fixing roller pair 14 and also the first sheet of the recording paper 23 waiting at the first waiting position is conveyed to the side of the second conveying path 27 (step S20, S30). Namely, the transferred unfixed toner image is thermally fixed onto the second sheet of the recording paper 23 by the fixing roller pair 14, being forwarded to the paper reversing roller pair 12 by way of the conveying direction change-over plate 11. At the same time, the first sheet of the recording paper 23 is conveyed to the second conveying path 27 by way of the conveying path change-over plate 11 by reversing the rotation of the paper revering roller pair 12, and is made to wait at the second waiting position by halting the rotation of the paper halting roller pair 20 at the time of detecting the top end of the paper by the paper detecting sensor 33.

Here, the process goes back to the processing by step S12, and since, at step S13, the printing data to be printed on the (n+1)th side (the second side) are not erased yet but are still stored in the print data memory 34, the process goes to step S16 by way of step S15. Here, the controller 18 halts the forward-rotating paper reversing roller pair 12 at the given timing, and makes the second sheet of the recording paper 23 wait at the first waiting position with its top end part of the recording paper projected over the paper receiving part 10 (step S16).

Further, at step S32, it is judged whether or not the recording paper 23 is present or absent at the second waiting position, but the process goes to step S33 because the first sheet of the recording paper 23 is present at the second waiting position at this time. At step 33, the second sheet of the recording paper 23 waiting at the first waiting position is conveyed to the side of the second conveying path 27 by turning the conveying direction change-over plate 11 clockwise and reversing the rotation of the paper reversing roller pair 12, before turning the conveying direction change-over plate 11 clockwise and processing the first sheet of the recording paper 23 waiting at the first waiting position, and the first sheet of the recording paper 23 standing by at the second waiting position is processed.

In the processing of the above first sheet, the paper halting roller pair 20 is rotated forward at the time of detecting the second sheet of the recording paper 23 at the first waiting position by the paper detecting sensor 35, and the first sheet of the recording paper 23 is conveyed to the printing part. The controller 18 feeds the first sheet of the recording paper 23 to the printing part by means of resist roller pair 31, and transfers the second sheet toner image generated by the printing processing unit 24 onto the other side of the sheet of the recording paper 23. Next, the transferred unfixed toner image is thermally fixed by means of the fixing roller pair 14 before being discharged on the paper receiving part 10 by way of the conveying direction change-over plate 11.

Further, the controller 18 reverses the front and back of the second sheet of the recording paper 23 conveyed to the side of the second conveying path 27 by way of the conveying direction change-over plate 11, and sends it further to the paper halting roller pair 20 by way of the conveying roller pair 19. At step S18, it is judged whether or not the second sheet of the recording paper 23 is detected by the paper detecting sensor 33, and at the time of being detected, the forward-rotating paper halting roller pair 20 is halted at the given timing to halt this recording paper 23 at the second waiting position (step S19).

At step S20, it is judged whether or no the printing data to be printed on both sides of the (n+2)th side (the third side), however, since the printing data for the third side is already erased at this time, the process goes to step S22. At step S22, the paper halting roller pair 20 is rotated forward at the given timing, and the second sheet of the recording paper 23 standing by at the second waiting position is conveyed to the printing part.

Prior to this, at the time when the paper detecting sensor 32 detects that the first sheet of the recording paper 23 passes through the printing part, the controller 18 fetches the printing data for the (n+3)th side (the fourth side) from the higher rank apparatus into the printing data memory 34 and expands the printing image related to this printing data into a printable state. The controller 18 rotates forward the paper halting roller pair 20, conveying the second sheet of the recording paper 23 to the printing part, feeding it into the printing part by means of the resist roller S1, and transferring the fourth side toner image generated by the printing processing unit 24 onto the other side of the recording paper 23 (steps S23, S24). Following this, the transferred unfixed toner image is thermally fixed by means of the fixing roller pair 14, and then the second sheet of the recording paper 23 is discharged on the paper receiving part 10 by the paper reversing roller pair 12 (steps S26, S34).

Through the above-described processing, printing is completed on one and the other sides of both two successive sheets of the recording paper, and both side printing can smoothly be performed on multiple sheets of the recording paper 23 by successively repeating these processing.

For example, if the second sheet of the recording paper 23 is fed at the time when the expansion of the printing data for the second and third sides is not completed yet, the first sheet of the recording paper 23 of which the first side is printed on and waiting at the second waiting position and the second sheet of the recording paper 23 of which the third side is printed on and waiting the first waiting position have to wait while the printing data to be printed are being expanded. In such a case, the second sheet of the recording paper 23 is kept projected outward of the apparatus for a relatively long time. Therefore, there is a danger of such a problem that a user might pull out the second sheet of the recording paper 23 under printing.

However, according to the example of this embodiment, the printing data expansions for the second and third sides are completed before the second sheet of the recording paper 23 is fed. Therefore, this permits to successively perform printing on the second and third sides of the second and first sheets of the recording paper 23. Consequently, since it is possible to smoothly and sequentially print printing data corresponding to successive sheets of the recording paper 23 and shorten a time of the waiting state in which the recording paper 23 is projected outward of the apparatus, the above-described problem can be avoided. Also, this eliminates the need for a large configuration of the paper receiving part and the conveying paths, and permits to avoid upsizing the apparatus. Moreover, since the print data memory 34 has only to have a storage capacity enough for storing print data for two sides, it can be constituted of small type of memory.

As explained above, while the present invention permits to reduce as much as possible a waiting time of the recording paper being projected outward of the apparatus, the invention permits to smoothly perform both side printing and also avoid an increase in size and costs of the apparatus.

While the present invention has thus far been described in conjunction with only a preferred embodiment thereof, it will now be readily possible for one skilled in the art to put the present invention into effect in various other manners.

What is claimed is:

1. An image forming apparatus comprising:

storage means for storing inputted printing data;

printing means for printing a recording paper based on the printing data stored in said storing means;

first waiting means;

first feeding means for feeding said recording paper after printing to said first waiting means, said first waiting means causing said recording paper to wait at said waiting means for a first waiting period;

paper reversing means for reversing the recording paper waiting at said first waiting means;

second waiting means;

second feeding means for feeding the reversed recording paper from said paper reversing means to said second waiting means, said second waiting means causing the recording paper sent from said paper reversing means to wait at said second waiting means for a second waiting period and then feeding the reversed recording paper to said printing means; and control means which reads and expands printing data for two pages succeeding the page printed on said preceding recording paper into a printable state after said recording paper has left said printing means for said first waiting means.

2. An image forming apparatus as claimed in claim 1, wherein said control means causes said printing means to complete printing on one side of the succeeding recording paper before printing on the other side of the preceding recording paper waiting at said second waiting means, and then causes said paper reversing means to reverse the succeeding recording paper waiting at said first waiting means and then causes said second feeding means to forward the reversed succeeding recording paper to said second waiting means and causes said second waiting means to send said reversed succeeding recording paper to said printing means to perform printing on the other side thereof at a predetermined timing.

3. An image forming apparatus as claimed in claim 2, wherein said first waiting means discharges the recording paper after having been printed on one and the other side thereof outside of said image forming apparatus.

4. An image forming method for sequentially printing on one and the other side of a recording paper based on inputted printing data, said image forming method comprising:

forwarding one recording paper to a printing position;

printing data for a first page on one side of the one recording paper at the printing position;

forwarding the one recording paper after printing of the first page on the one side to a first waiting position whereat the one recording paper is held for a first waiting period;

reading data for second and third pages succeeding the first page to expand the data into a printable state;

printing the data for said third page on one side of a succeeding recording paper;

reversing the one recording paper after the first waiting period;

forwarding the reversed one recording paper from the first waiting position to a second waiting position whereat the reversed one recording paper is held for a second waiting period;

forwarding the reversed preceding recording paper to the printing position after the second waiting period; and printing the data for the second page on the other side of the preceding recording paper at said printing position.

* * * * *